K. GODDARD.
Machine for Rolling Tea Leaves.
No. 47,201. Patented April 11, 1865.
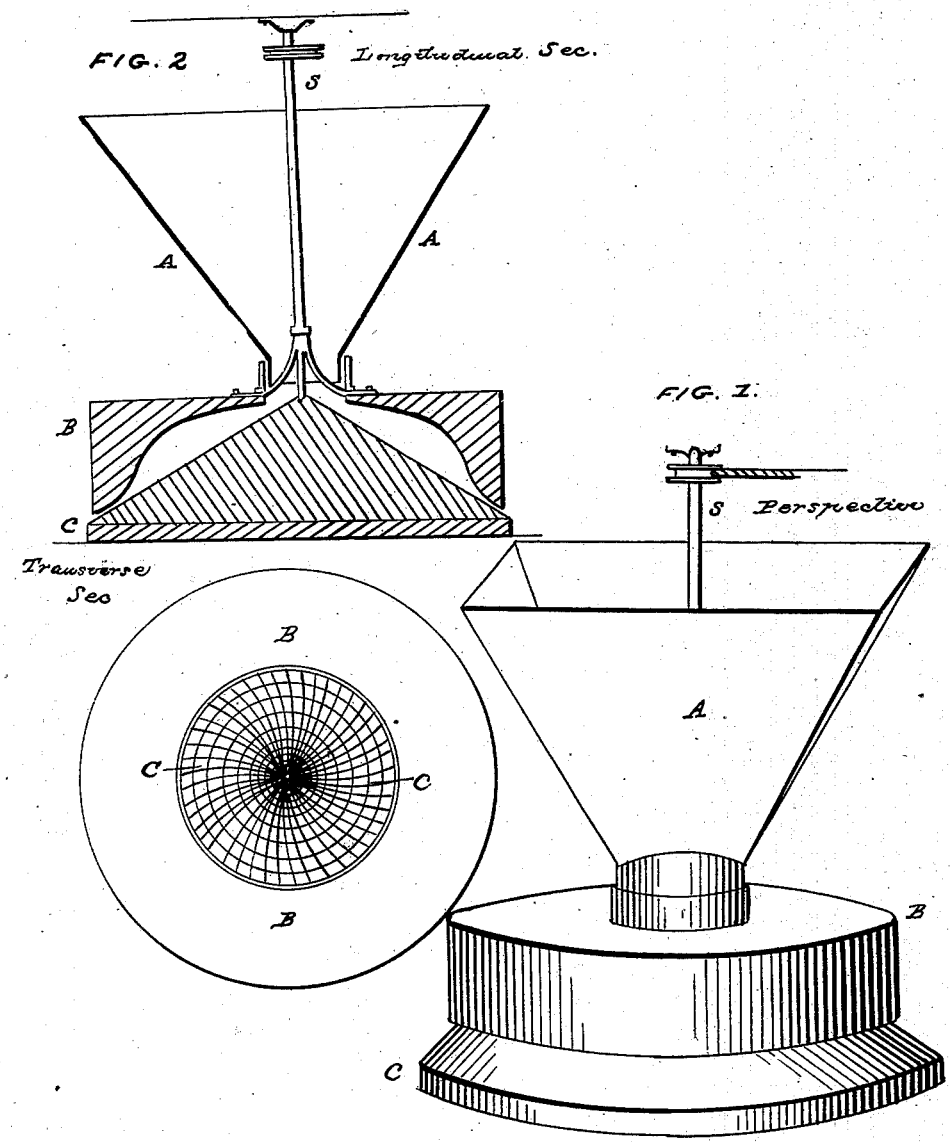
WITNESSES:

UNITED STATES PATENT OFFICE.

KINGSTON GODDARD, OF PHILADELPHIA, PENNSYLVANIA.

MACHINE FOR ROLLING TEA-LEAVES.

Specification forming part of Letters Patent No. 47,201, dated April 11, 1865.

*To all whom it may concern:*

Be it known that I, KINGSTON GODDARD, D. D., of the city of Philadelphia, in the county of Philadelphia and State of Pennsylvania, have invented a new and useful Machine for Rolling Leaves for Tea; and I do hereby declare that the following is a full, clear, and exact description of the construction and operation of the same, reference being had to the annexed drawings, making a part of this specification, in which—

Fig. 1 is a perspective view; Fig. 2, a longitudinal sectional elevation; Fig. 3, a transverse section.

A is the hopper to receive the leaves and discharge them into the space between the upper roller, B, and the lower roller, C. The action of these rollers is such that by revolving either one while the other is stationary, or at different degrees of speed, or in opposite directions, the said leaves are rolled for tea in imitation of the imported article. Said rollers may be of any form, and be grooved or smooth, and of any material whatever, as experience shall decide.

What I claim as my invention is—

The machine, substantially described, which submits the leaves to the rolling action of the two described rollers.

KINGSTON GODDARD.

Witnesses:
J. W. QUIGGLE,
GEO. G. THOMAS.